(12) United States Patent
Reynolds

(10) Patent No.: US 9,557,421 B2
(45) Date of Patent: *Jan. 31, 2017

(54) LANE CHANGE MONITORING

(71) Applicant: Trimble Navigation Limited, Sunnyvale, CA (US)

(72) Inventor: James C Reynolds, San Jose, CA (US)

(73) Assignee: Trimble Inc., Sunnyvale, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/546,768

(22) Filed: Nov. 18, 2014

(65) Prior Publication Data

US 2015/0134243 A1     May 14, 2015

Related U.S. Application Data

(63) Continuation of application No. 13/828,580, filed on Mar. 14, 2013, now Pat. No. 8,972,077.

(60) Provisional application No. 61/662,080, filed on Jun. 20, 2012.

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *G01S 19/42* | (2010.01) |
| *G07C 5/00* | (2006.01) |
| *G01C 21/34* | (2006.01) |
| *G07C 5/08* | (2006.01) |

(52) U.S. Cl.
CPC ............. *G01S 19/42* (2013.01); *G01C 21/34* (2013.01); *G06F 17/00* (2013.01); *G07C 5/008* (2013.01); *G07C 5/0816* (2013.01)

(58) Field of Classification Search
CPC ................................ G01C 21/34; G01S 19/42
USPC .............................................................. 701/468
See application file for complete search history.

(56) References Cited

U.S. PATENT DOCUMENTS

| | | | |
|---|---|---|---|
| 6,502,035 | B2 | 12/2002 | Levine |
| 7,113,866 | B2 | 9/2006 | Taliwal et al. |
| 8,972,077 | B2 | 3/2015 | Reynolds |
| 2002/0019703 | A1 | 2/2002 | Levine |
| 2005/0278095 | A1 * | 12/2005 | Taliwal ........................ 701/41 |

* cited by examiner

*Primary Examiner* — Maceeh Anwari
(74) *Attorney, Agent, or Firm* — Kilpatrick Townsend & Stockton LLP

(57) ABSTRACT

A method for detecting a lane change by a moving vehicle is disclosed. In one embodiment, it is detected that a first heading of a moving vehicle has met a parameter defining a stable heading. It is then detected that a second heading of the moving vehicle has subsequently met a parameter defining an unstable heading. It is then detected that a third heading of the moving vehicle has subsequently met a parameter defining a stable heading within a pre-determined time parameter and that the third heading equals the first heading within a pre-defined margin. An indication is then generated that the moving vehicle has performed a lane change.

21 Claims, 14 Drawing Sheets

DriveSafe Fleet Report

Customer: DriveSafe
Standard: National
03 Aug 2003 to 20 Sep 2003

| Vehicle | Loaded Left Turn | Loaded Right Turn | Loaded Stop | Loaded Start | Unloaded Turn | Unloaded Stop | Unloaded Start | Speed | Overall Score |
|---|---|---|---|---|---|---|---|---|---|
| 180 | 96 | 95 | 92 | 94 | 94 | 94 | 93 | 89 | 94 |
| 181 | 94 | 87 | 92 | 92 | 91 | 94 | 95 | 99 | 91 |
| 182 | 101 | 91 | 94 | 98 | 98 | 98 | 95 | 103 | 96 |
| 187 | 117 | 108 | 113 | 93 | 113 | 113 | 103 | 104 | 110 |
| 192 | 98 | 87 | 118 | 126 | 104 | 125 | 147 | 100 | 105 |
| 196 | 100 | 102 | 98 | 113 | 97 | 95 | 114 | 103 | 101 |
| DS3000571 | 111 | 94 | 122 | 156 | 108 | 130 | 163 | - | 115 |
| DS3000572 | 133 | 97 | 117 | 163 | 96 | 126 | 149 | - | 116 |
| Weighting | 3 | 5 | 2 | 1 | 3 | 2 | 1 | 1 | |

END OF REPORT

FIG. 5

FIG. 6

LANE CHANGE MONITORING

CROSS REFERENCE TO RELATED APPLICATIONS—CONTINUATION

This application is a continuation application of and claims priority to and benefit of U.S. patent application Ser. No. 13/828,580 filed on Mar. 14, 2013 entitled "Lane Change Monitoring" by James C. Reynolds, now U.S. Pat. No. 8,972,077.

Application Ser. No. 13/828,580 claimed priority to U.S. Provisional Application Ser. No. 61/662,080, entitled "LANE CHANGE MONITORING," with filing date Jun. 20, 2012, by James C. Reynolds; the disclosure of Provisional Application Ser. No. 61/662,080 was incorporated by reference into application Ser. No. 13/828,580.

BACKGROUND

In vehicle fleet operations, monitoring driver safety is desirable to identify drivers who may be operating vehicles in an un-safe manner so that the un-safe drivers can be instructed in safe vehicle operations. Furthermore, safe operating parameters for vehicles are different depending on what type of vehicle is being operated. As an example, in the ready-mixed concrete industry, truck rollover rates are higher than other types of trucks due to the higher center of gravity of loaded concrete mixer trucks and the fact that, as the drum of the mixer rotates, concrete is displaced to the left side which makes right turn more likely to result in the truck rolling over.

BRIEF DESCRIPTION OF THE DRAWINGS

FIG. 5 illustrates DriveSafe reports that include individual scores for each driving maneuver, plus a weighted composition score for each vehicle in accordance with one or more embodiments.

FIG. 6 shows how to run a safety report by using a DriveSafe implementation in accordance with one or more embodiments.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "detecting," "generating," "determining," "generating," "using," "storing," "comparing," or the like, often (but not always) refer to the actions and processes of a computer system or similar electronic computing. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

Figure 1:
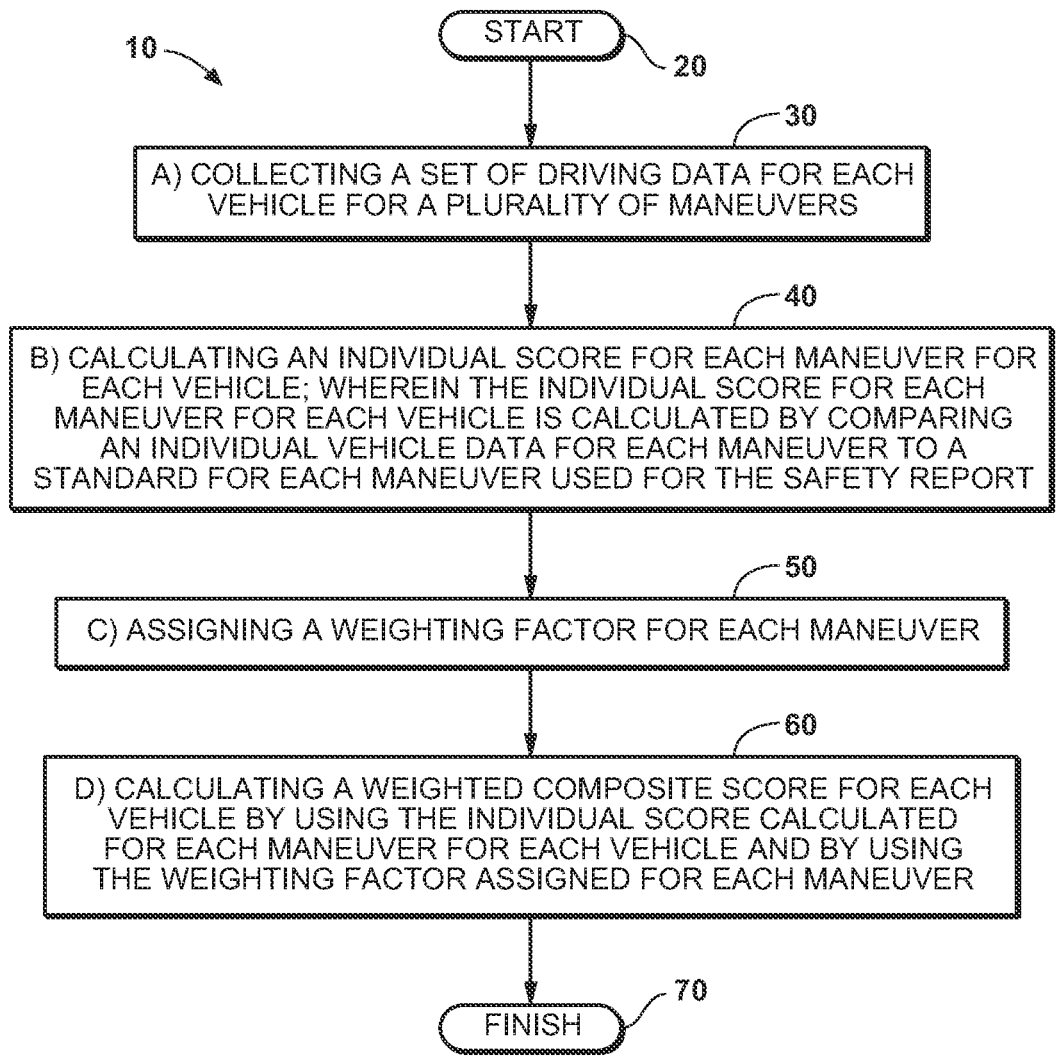
FIG. 1 illustrates the flow chart of the method for calculating an individual score for each maneuver for each vehicle, and for calculating a weighted composite score for each vehicle in accordance with one or more embodiments.

FIG. 1 illustrates a flow chart 10 of a method for calculating an individual score for each maneuver for each vehicle, and for calculating a weighted composite score for each vehicle in accordance with one or more embodiments. As shown in flow chart 10 of FIG. 1, in one embodiment the method comprises an operation 30 of collecting a set of driving data for each vehicle for a plurality of maneuvers;

and an operation 40 of calculating an individual score for each maneuver for each vehicle. The individual score for each maneuver for each vehicle is calculated, for example, by comparing individual vehicle data for each maneuver to a standard for each maneuver used for the safety report.

Figure 2A:
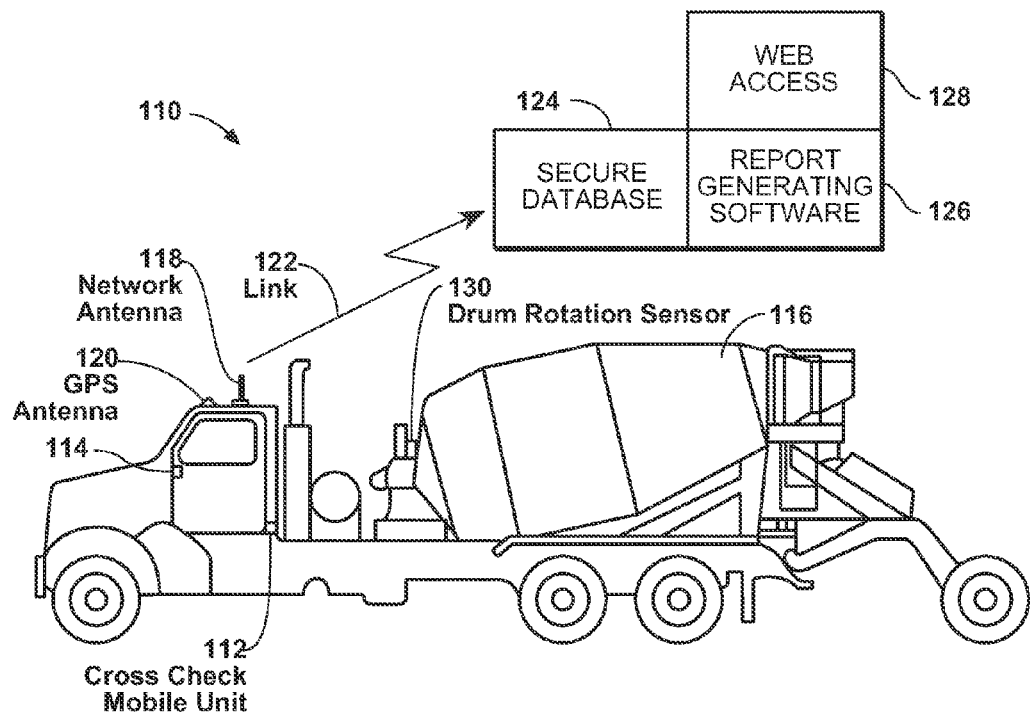
FIG. 2A depicts a mixer drum truck quipped with an apparatus for generating safety reports to vehicle owners and to fleet manager detailing how their drivers operate their vehicles in accordance with one or more embodiments.

In one embodiment, FIG. 2A depicts a mixer drum truck 110 having a drum 116. The mixer drum truck 110 is equipped with a mobile unit 112 including an apparatus for generating safety reports to vehicle owners and to fleet managers detailing how their drivers operate their vehicles. The mobile unit 112 communicates with a secure database 124 by using a network antenna 118 and a communication link 122. Report generating software 126 and Web access component 128 facilitate processing the collected safety data stored in the secure database 124 and generating a safety report that is also accessible via the Web.

Figure 2B:
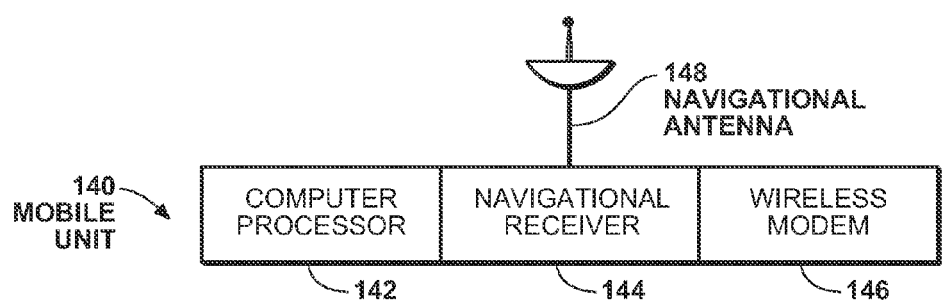
FIG. 2B shows in more detail an apparatus for generating safety reports in accordance with one or more embodiments.

FIG. 2B shows in more detail an apparatus 140 for generating safety reports in accordance with one or more embodiments. The apparatus 140 includes: a computer processor 142, a navigation receiver 144 including a navigational antenna 148, a communication means configured to transmit data to the secure database 124 of FIG. 2A that is Web-accessible to process the safety data and to generate a safety report. In one embodiment, the communication means comprises a wireless modem 146. In accordance with one or more embodiments, apparatus 140 may be a component of mobile unit 112, or a stand-alone device.

In one or more embodiment, when the vehicle is a mixer drum truck 110 including a rotating drum 116, as shown in FIG. 2A, the drum speed sensor 130 of FIG. 2A is configured to measure a mixer drum speed to facilitate determining whether the Center of Gravity (CG) of the vehicle may be shifted to one side due to the rotation of the concrete in the rotating drum. In one embodiment, the mixer drum truck 110 can perform each of the following maneuvers that are evaluated in the safety report: (a right turn when the vehicle is loaded, a left turn when the vehicle is loaded, a start when the vehicle is loaded, a stop when the vehicle is loaded, a turn when the vehicle is unloaded, a start when the vehicle is unloaded, and a stop when the vehicle is unloaded). In one or more embodiments, the left and right turns, and the loaded and unloaded trips are assigned different weighting factors.

In one or more embodiments, the distinguishing of driver performance between right and left turns is relevant if, for example, the vehicle has a center of gravity that is offset from the centerline of the vehicle. In the case of a ready mixed mixer drum truck (e.g., 110 of FIG. 2A), the concrete mix is displaced to the driver's side of the vehicle as the drum turns. As the drum turns faster, more of the mix is moved to the driver's side and higher from the ground than it is when the drum is stopped. This can make right hand turns more dangerous due to the shift in the center of gravity. As a result, the separation of vehicle accelerations into separate bins for left and right turns is important. In addition, the speed of the drum can also take into account because the degree of offset of the center of gravity increases with drum speed. Additionally, because right turns are generally much sharper than left turns, it can be more dangerous to perform a right turn at a given speed in comparison with a left turn. This is independent of whether there is a shift in the center of gravity of the vehicle or not. Thus, in accordance with various embodiments, a right turn is differentiated from a left turn, and can be given a different weight to account for the additional danger in performing a right turn. In countries where the vehicle drives on the left side of the road, the left turns are sharper than the right turns and can similarly be more dangerous.

Referring still to FIG. 1, in one embodiment, when the vehicle is a mixer drum truck 110 including a rotating drum 116, as shown in FIG. 2A, the operation 30 of collecting the set of driving data for each vehicle for the plurality of maneuvers performed by this vehicle further includes the operation of separating the set of driving data for each vehicle for the plurality of maneuvers into different categories. In this embodiment, as was stated above, the right turns and left turns, as well as loaded and unloaded trips, are separated into different categories, that is each maneuver is selected from the group comprising (a right turn when the vehicle is loaded, a left turn when the vehicle is loaded, a start when the vehicle is loaded, a stop when the vehicle is loaded, a turn when the vehicle is unloaded, a start when the vehicle is unloaded, and a stop when the vehicle is unloaded).

In general, any vehicle loaded with an asymmetric load (not shown) in such a way that its Center of Gravity (CG) is offset from the centerline of the vehicle, is subject to the weighing factors assignment based on differentiating between right and left turns and loaded and unloaded trips. A plurality of individual weight sensor (not shown) could detect loading differences between the right and left sides of such asymmetrically loaded vehicle and can be used to assign the weighting factors. Furthermore, as discussed above, because a right turn is generally much sharper than a left turn, weighing factors assignment based on differentiating between right and left turns and loaded and unloaded trips permits assessing the safe operation of the vehicle during the trip.

More specifically, in one embodiment the load in a liquid tanker truck (not shown) may shift significantly to the right of left during a turn, and depending on the baffle arrangement in the tank, the dynamic sloshing motion of the liquid and the loading of the vehicle, those shifts may be different between right and left turns. If this is the case, a plurality of liquid level sensor inside the tank (not shown) may be used to determine the degree of shift of the load and contribute to the driver performance scoring in much the same way as does drum speed in a ready mix truck.

Referring still to FIG. 1, in one embodiment, the operation 30 of collecting the set of driving data for each vehicle for the plurality of maneuvers further includes the operation of collecting the set of driving data for each vehicle for the plurality of maneuvers, wherein each maneuver is selected from the group consisting of: (a turn, a start, and a stop). In this embodiment, there is no difference between left and right turns, and between loaded and unloaded trips. Indeed, in some instances, the driver performance measurement is deployed on vehicles where there is no difference in the vehicle's weight between loaded and unloaded conditions. In such cases, maneuver statistics are collected on the vehicle but are not separated into loaded and unloaded bins. For example, data may be collected on a standard automobile. There is no appreciable difference in the weight of vehicle and driver during the day and therefore no need to distinguish between loaded and unloaded conditions. The reports would include a single set of maneuver scores plus a composite score rather than a loaded set and an unloaded set plus the composite.

Referring still to FIG. 1, in one embodiment the operation 30 of collecting the set of driving data for each vehicle for the plurality of maneuvers further includes the operation of obtaining a set of positioning data including a set of acceleration data and a set of speed data for each vehicle for each maneuver. The speed data is an average vehicle speed while operating.

In one embodiment, the operation of obtaining the set of positioning data including the set of acceleration data and the set of speed data for each vehicle for each maneuver further includes the operation of obtaining the set of positioning data including the set of acceleration data and the set of speed data for each vehicle for each maneuver by using a navigation system selected from the group consisting of: (GPS, GLONASS, combined GPS/GLONASS, GALILEO, pseudolite-based navigation system, and inertial navigation system).

A Satellite Positioning System (SATPS), such as the Global Positioning System (GPS), or the Global Orbiting Navigation Satellite System (GLONASS), or the combined GPS-GLONASS, (or the future GALILEO), uses transmission of coded radio signals, from a plurality of Earth-orbiting satellites. An SATPS antenna receives SATPS signals from a plurality (preferably four or more) of the SAPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites. The range ($r_i$) between the location of the i-th SATPS satellite and the SATPS receiver is equal to the speed of light c times ($t_i$) wherein ($t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite. After the SATPS receiver determines the coordinates of the i-th SATPS satellite by demodulating the transmitted ephemeris parameters, the SATPS receiver can obtain the solution of the set of the simultaneous equations for its unknown coordinates ($x_o$, $y_o$, $z_o$) and for unknown time bias error (cb). The SATPS receiver can also determine velocity of a moving platform.

Pseudolites are ground-based transmitters that can be configured to emit GPS-like signals for enhancing the GPS by providing increased accuracy, integrity, and availability. Accuracy improvement can occur because of better local geometry, as measured by a lower vertical dilution of precision (VDPD). Availability is increased because a pseudolite provides an additional ranging source to augment the GPS constellation.

Recent advances in Inertial Navigation Systems (INS) technologies make it feasible to build a very small, low power INS system. Acceleron Technology Inc., located in San Francisco, Calif. has built small light weight Inertial Navigation System (INS) using three accelerometers to measure three components of the local acceleration vector, three magnetometers to measure three components of the local gravitational vector, plus some software. An accelerometer is a sensor that measures acceleration, speed and the distance by mathematically determining acceleration over time. A magnetometer is a device that measures a local magnetic field. The local gravitational factor can be calculated by using the measured local magnetic field, because the local gravitational field, as well as the local magnetic field, are both defined by the local Earth geometry. As well explained in the book "Applied Mathematics in Integrated Navigation Systems", published by American Institute of Aeronautics and Astronautics, Inc., 2000, by Robert M. Rogers. The "Applied Mathematics in Integrated Navigation Systems" teaches how geometrical shape and gravitational models for representing the Earth are used to provide relationship between ECEF position x-y-z components and local-level latitude, longitude, and attitude positions. The "Applied Mathematics in Integrated Navigation Systems" also teaches how a vehicle's position change in geographical coordinates is related to the local Earth relative velocity and Earth curvature.

Referring still to FIG. 2A, one embodiment utilizes the Televisant® DriveSafe product developed by Trimble that includes a GPS navigation system including a GPS antenna 120, though any other disclosed above navigation system could be used in various embodiments. In one embodiment, positions are not used. The fact that velocities are part of a standard GPS data set facilitates determining velocities using a SATPS.

Referring still to FIG. 1, in one embodiment, wherein the vehicle is a mixer drum truck (e.g., 110 of FIG. 2A) equipped with a drum speed sensor (e.g., 130 of FIG. 2A), the operation 30 of collecting the set of driving data for each vehicle for the plurality of maneuvers further includes the operation of measuring a mixer drum speed by using the drum speed sensor 130 to determine the change in the Center of Gravity (CG) of the vehicle.

In one embodiment, wherein the vehicle is a tank truck used for transport of liquids (not shown), the operation 30 of collecting the set of driving data for each vehicle for the plurality of maneuvers further includes the operation of measuring a dynamic level of liquid in the tank truck by using a plurality of liquid level sensor (not shown) to determine the change in the Center of Gravity (CG) of the vehicle.

Referring still to FIG. 1, in one embodiment the operation 40 of calculating the individual score for each maneuver for each vehicle further includes the operation of comparing the set of acceleration data for each vehicle for each maneuver to a standard for each maneuver for a customer's fleet. In this embodiment, the operation of comparing the set of acceleration data for each vehicle for each maneuver to the standard for each maneuver for the customer's fleet further comprises the operation of calculating a mean and a standard deviation for a set of acceleration data for each maneuver for the customer's fleet as the standard for each maneuver for the customer's fleet.

In one embodiment, the operation 40 of calculating the individual score for each maneuver for each vehicle further includes the operation of comparing the set of acceleration data for each vehicle for each maneuver to a standard for each maneuver for an industry as a whole. In this embodiment, the operation of comparing the set of acceleration data for each vehicle for each maneuver to the standard for each maneuver for the industry as a whole further comprise the operation of inputting a mean and a standard deviation for a set of acceleration data for each maneuver used as the standard for the industry as a whole.

Vehicle scores are calculated by comparing the vehicle data to the standard used for the report. The selection of the performance standard for the fleet or for the industry as a whole is made when the report is run, or can be a default setting. In one embodiment, if the vehicle's acceleration data matches the standard's average, the score is arbitrarily set to 100. One standard deviation in the standard's data is assigned the value of 10 points, so if the vehicle's acceleration is higher than the standard's average by one standard deviation, the score is 110. For data two standard deviations below the average standard, the score is 80. The data are assumed to follow a statistical "normal distribution", so 98% of all scores will be between 70 and 130. However, other methods of assigning a score to a vehicle's acceleration data based upon a given standard can be used in accordance with various embodiments.

In one embodiment, the Televisant® DriveSafe product developed by Trimble measures the accelerations (commonly called G-forces) exerted on the truck during various driving maneuvers (turns, starts, stops, etc.) and compares these measurements to the average for the customer's fleet or to the industry as a whole. Scores are calculated for several categories of maneuvers and the individual scores plus a composite DriverScore is reported. Mixer drum speed (if the truck is equipped with a drum-speed sensor) and vehicle speed are also considered. The driver's performance can be compared against the rest of the drivers in the fleet and against the industry average.

Referring still to FIG. 1, in one embodiment the method of flowchart 10 further comprises: operation 50 of assigning a weighting factor for each maneuver; and operation 60 of calculating a weighed composite score for each vehicle by using the individual score calculated for each maneuver for each vehicle and by using the weighting factor assigned for each maneuver.

In one embodiment, the operation 50 of assigning the weighting factor for each maneuver further includes the operation of assigning a predetermined weighting factor for each maneuver. For instance, developed by Trimble "the Overall Score: is a weighted average of the individual maneuver scores. The default values were judged by people in the industry to be a good set of weights for overall driver safety in a ready mixed mixer drum truck. These values can be changed based on the operations manager's judgment or because of special local conditions. A different set of weights may be chosen to extend the analysis for other purposes. A set that emphasizes tire wear might more heavily weight stops and turns, where a fuel-oriented report might have higher weights on starts and stops.

Referring still to FIG. 1, in one embodiment, the operation 50 of assigning the weighting factor for each maneuver further includes the operation of calculating the weighting factor for each maneuver.

In one embodiment, when the vehicle is a mixer drum truck (e.g., 110 of FIG. 2A) equipped with the drum speed sensor (e.g., 130 of FIG. 2A), the operation 50 of assigning the weighting factor for each right turn maneuver further includes the operation of calculating the weighting factor for each right turn maneuver based on the mixer drum speed measured by the drum speed sensor for each maneuver.

In one embodiment, when the vehicle is the tank truck used for transport of liquids (not shown), the operation 50 of assigning the weighting factor for each maneuver further includes the operation of calculating the weighting factor for each maneuver based on the dynamic level of liquid in the tank truck measured by the plurality of liquid level sensors (not shown) for each maneuver.

In one embodiment, the present technology is implemented by Trimble Navigation Limited, located in Sunnyvale, Calif., by using a DriveSafe program. The DriveSafe program provides a window visibility into individual driver behavior beyond just driving speed by providing indicators of other, less-noticeable forms of aggressive driving. This is done by using Scorecards in one or more embodiments.

Figure 3:
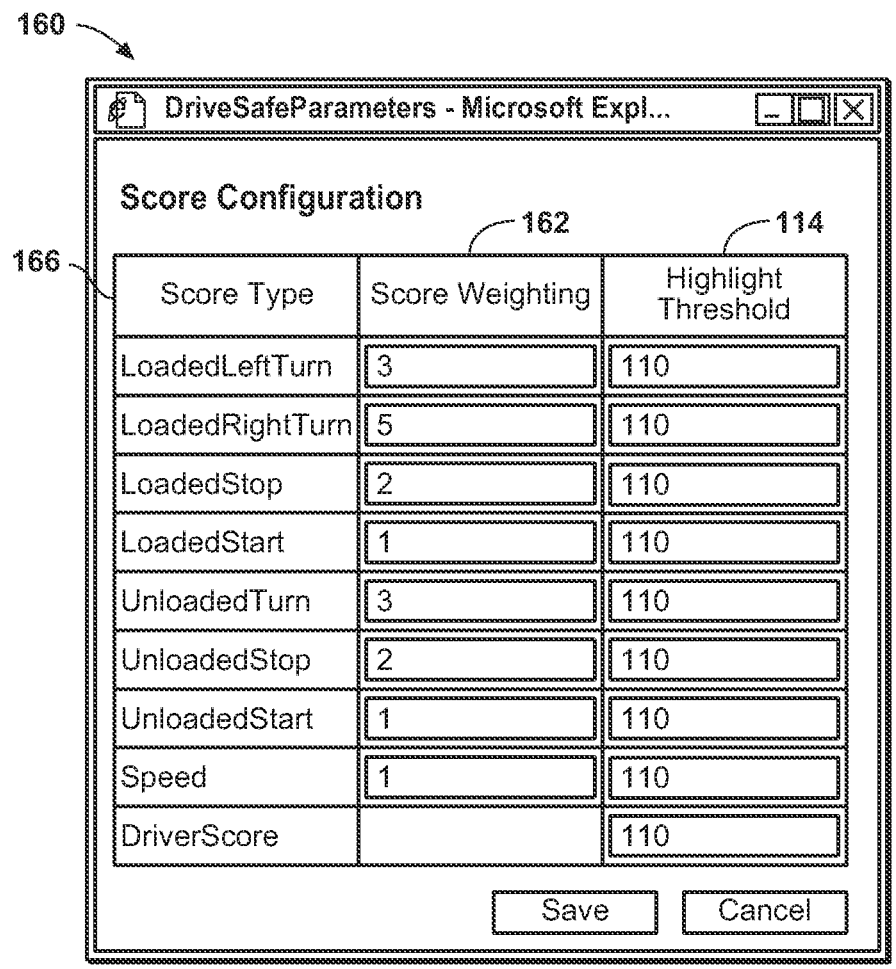
FIG. 3 illustrates the Score Configuration button screen on the Report Options screen in the DriveSafe computer program Televisant™ that is implemented in accordance with one or more embodiments.

More specifically, FIG. 3 illustrates the Score Configuration button 160 on the Report Options screen in the DriveSafe computer program Televisant™ that implements at least one embodiment. There are two configuration items that can be set using the Score Configuration button 160 on the Report Options screen. The first is the Score Weighting value 162. This defines the contribution of each of the maneuver types to the composite driver score. If, for example, loaded right turns are considered to be five times as important as unloaded starts, the Loaded Right Turn value should be set to 5 and the Unloaded Start value to 1. The weights can be set to any value, including zero, and do not need to add up to any particular sum. Since changing these values can change the relative rankings of different vehicles, the weights used are printed on the report itself. It is expected that once a set of weights is defined, it should not be changed arbitrarily. However, a different set of weights can be used for different purposes. A report that is intended for driver safety may have one set of weights; a different set might be defined if a more equipment-oriented report that places a higher weight on those maneuvers that cause excessive tire wear or engine over-revving is desired.

Referring still to FIG. 3, the second configuration item is the Highlight Threshold 164. Scores that are greater than or equal to these setting are highlighted in yellow on the reports and appear in red on the charts. This facilitates identifying driving patterns which may be unsafe and require counseling, or retraining of, a driver who is operating a vehicle in excess of safe operating standards.

Figure 4:
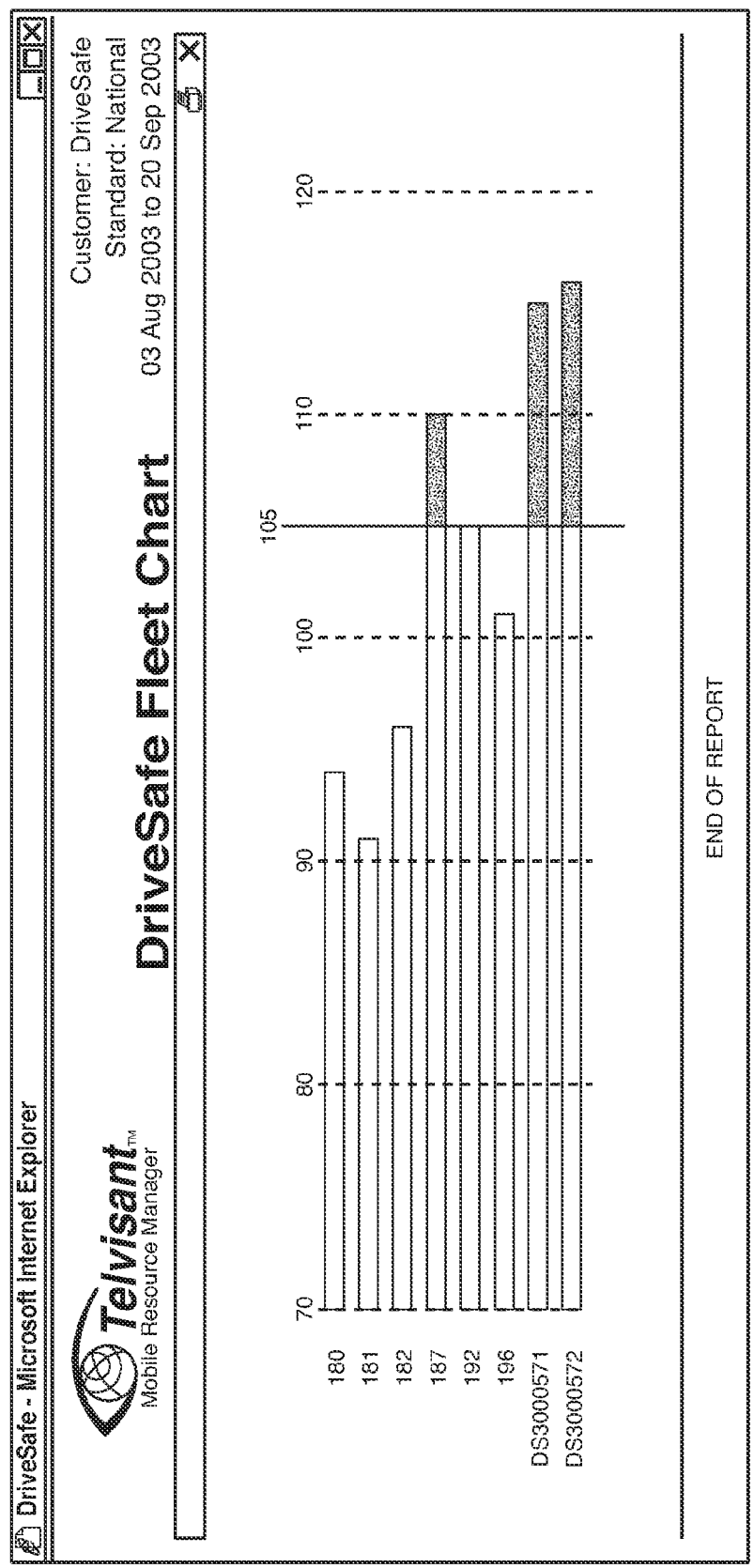
FIG. 4 depicts a DriveSafe Fleet Chart that provides individual weighted composite scores for different vehicles that are identified by different numbers in accordance with one or more embodiments.

FIG. 4 illustrates a DriveSafe Fleet Chart 200 that provides individual scores for different vehicles that are identified by the following numbers: (180, 181, 182, 187, 192, 196, DS3000571, and DS3000572). Supervisors can use this tool to conduct specifically targeted driver training and counseling programs. As shown in FIG. 4, from DriveSafe Fleet Chart 200 one can see that vehicles DS3000571 and DS3000572 have the safety scores far worse than the national standard chosen for this particular report. On the other hand, the vehicles 180, 181, and 182 have safety scores far better than the national averages.

In many cases, otherwise good drivers simply need to be reminded about certain elements of their driving behavior, such as better preparing to stop when the truck is loaded. In other cases, drivers need to be trained to significantly alter their driving style when the truck is loaded in order to avoid potential rollover situations. In one embodiment, the driver scores are accumulated over a long period of time, allowing visibility into trends in driving behavior rather than isolated incidents.

DriveSafe is not typically used as a direct, near-accident-event indicator. The Scorecard is intended to assist in training and monitoring and would not ordinarily be used, for example, to unfairly penalize a driver for one or two hard maneuvers that may have been necessary due to poor driving of others on the road. For this reason the reports should typically be run using, for example, a one-week or longer reporting period.

DriveSafe reports include individual scores for each driving maneuver, plus a weighted composite score for the vehicle, as shown in FIG. 5. These data can be presented and printed in a tabular Fleet Report and/or an easy-to-read Fleet Chart. The data can also be exported in a format compatible with standard data analysis tools such as Microsoft Excel.

Figure 6:
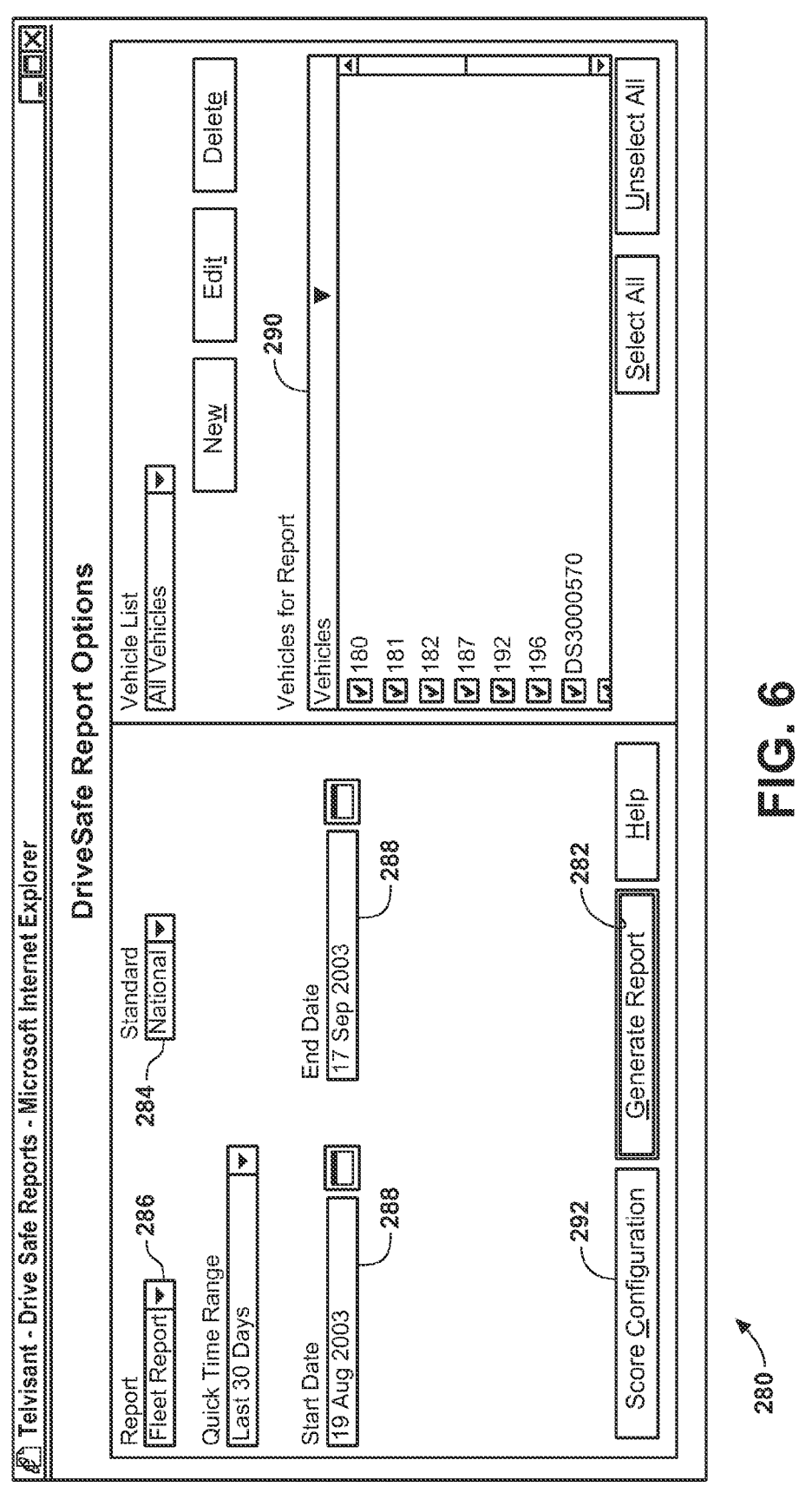

FIG. 6 shows how to run a safety report by using a DriveSafe implementation in accordance with one or more embodiments. Several settings can be made before running a report. For instance, the report type can be a Fleet Report or a Fleet Chart (button 286); the standard against which the vehicles are scored could be chosen as a Fleet Standard, or as a National Standard (button 284); the date range over which the report is run (buttons 288); the vehicles to be included in the report (button 290). The report or chart is displayed on the screen after clicking the Generate Report button 282. The report can then be printed using the printer icon, or exported to an Excel worksheet, or a file on the local computer using the disk icon. The Score Configuration button can be used to choose the Score weighting value, or a Highlight Threshold as discussed above with reference to FIG. 3.

In one embodiment, in order to generate a fleet or a vehicle safety report, several general operations should be performed. More specifically, in one embodiment the method of generating a safety report for a fleet of vehicles comprises: (A) collecting raw acceleration data for each maneuver for each vehicle by using a firmware in a vehicle-based mobile unit; (B) processing the collected raw acceleration data; and (C) transmitting the collected processed acceleration data to a secure database (e.g., 124 of FIG. 2A)

If the vehicle is such that left and right turns, as well as loaded and unloaded trips, are in different categories (for example, a drum mixer truck), the operation (A) of collecting the raw acceleration data for each maneuver for each vehicle further includes the operation of collecting the raw acceleration data for each maneuver for each vehicle by using the firmware in the vehicle-based mobile unit where each such maneuver is selected from the group consisting of: (a right turn when the vehicle is loaded, a left turn when the vehicle is loaded, a start when the vehicle is loaded, a stop when the vehicle is loaded, a turn when the vehicle is unloaded, a start when the vehicle is unloaded, and a stop when the vehicle is unloaded).

If the vehicle is such that left and right turns are in the same category, but loaded and unloaded trips are in different categories (for example, a symmetrically loaded vehicle), the operation (A) of collecting the raw acceleration data for each maneuver for each vehicle further includes the operation of collecting the raw acceleration data for each maneuver for each vehicle by using the firmware in the vehicle-based mobile unit wherein each such maneuver is selected from the group consisting of: (a turn when the vehicle is loaded, a start when the vehicle is loaded, a stop when the vehicle is loaded, a turn when the vehicle is unloaded, a start when the vehicle is unloaded, and a stop when the vehicle is unloaded).

In one embodiment, when the left and right, as well as loaded and unloaded trips, are not differentiated, the operation (A) of collecting the raw acceleration data for each maneuver for each vehicle further includes the operation of collecting the raw acceleration data for each maneuver for each vehicle by using the firmware in the vehicle-base mobile unit wherein each maneuver is selected from the group consisting of (a turn, a start, and a stop).

Figure 7:
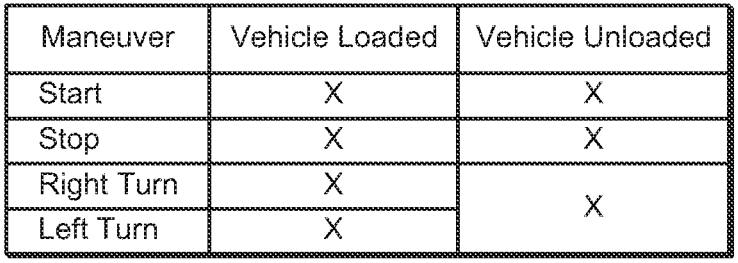
FIG. 7 illustrates how raw data is collected by measuring a set of acceleration values for different maneuvers under different vehicle conditions in the following categories (start, stop, right turn, left turn, loaded vehicle, and unloaded vehicle) in accordance with one or more embodiments.

FIG. 7 illustrates how the raw data is collected by measuring a set of acceleration values for different maneuvers under different vehicle conditions in the following categories: (start, stop, right turn, left turn loaded vehicle, and unloaded vehicle). In the most general case, when each such maneuver is selected from the group consisting of: (a right turn when the vehicle is loaded, a left turn when the vehicle is loaded, a start when the vehicle is loaded, a stop when the vehicle is loaded, a turn when the vehicle is unloaded, a start when the vehicle is unloaded, and a stop when the vehicle is unloaded), the acceleration values are measured for different maneuvers under different vehicle conditions in the following categories: (start, stop, right turn, left turn loaded vehicle, and unloaded vehicle).

Referring still to FIG. 7, after a maneuver has been detected and has been completed, the maximum acceleration value reached in that maneuver is saved for further processing. The vehicle is determined to be loaded between the time the mobile unit 112 detects loading at a home site, and time that a pour is detected at a job site. The unloaded condition is between the pour and the next loading.

The DriveSafe firmware in the mobile unit also gathers vehicle speed data, as was disclosed above. The speed is sampled, for example, once per second and the maximum speed over the past minute is determined. A counter in the speed category corresponding to this maximum speed is incremented.

With much DriveSafe data, it can be assumed that, over broad reporting periods of time, all drivers will encounter essentially similar jobs and driving conditions, and that an average vehicle speed for all driving will be relevant. The data collection algorithm also corrects for missing data due to short GPS dropouts and errors that may occur during satellite constellation changes. Wireless communication fades do not affect the system, as data are retained and reliably sent when the vehicle returns to a better coverage area.

For each category of data, a set of data "bins" is reserved. Each bin includes a count of the occurrences of an acceleration value in a particular range. After the maximum acceleration for a maneuver has been calculated, the count in the bin in which the acceleration falls is incremented.

DriveSafe also considers the effect of the asymmetrical load on truck stability. In the case of drum mix trucks, the mixer drum speed affects the truck's stability during right turns. For example, because of the dynamics of the concrete in the drum, a higher drum speed makes right turns more prone to safety issues. In one or more embodiments, this is factored into the data by applying a bin weighting factor. For example, this is factored into the data by incrementing the bin for a higher acceleration than that actually measured. Above a maximum acceptable drum speed, the measured acceleration is increased proportionally to the excess drum speed, causing the driver's right turn to be recorded as having a higher acceleration.

In one embodiment, the counts in the acceleration bins are transmitted to the database when the truck's ignition is turned off. This is done automatically using reliable wireless communications without operator intervention and without any manual data gathering procedures. After transmitting the data to the database, the bin counts are cleared. In another embodiment, whenever a network device is detected which is permitted to receive this information (e.g., a wireless router, RFID reader, or another vehicle configured to receive and forward this data), the acceleration bins are transmitted to the database. In other words, there is no necessity for the truck's ignition to be turned off.

Figure 8:
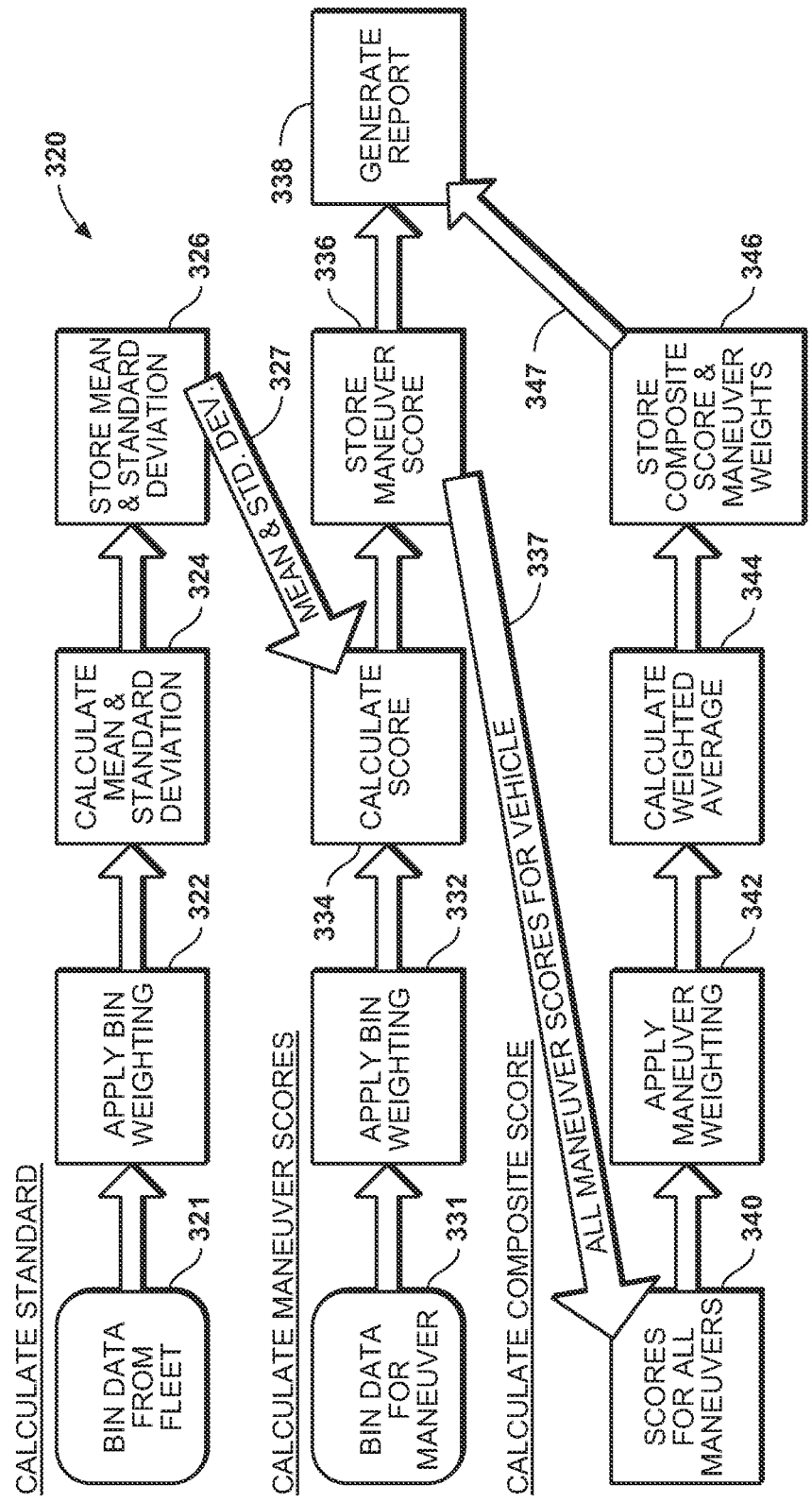
FIG. 8 shows the flow chart of the overall processing of bin data to determine a vehicle score in accordance with one or more embodiments.

The overall processing of bin data to determine a vehicle score is shown in the flow chart 320 of FIG. 8. The disclosed above bin weighting procedure is applied to the counts in each bin before further processing is done.

To calculate the standards, the acceleration data on a group of vehicles (e.g., a fleet) (block 321 of FIG. 8) on each maneuver is collected. The acceleration data includes counts of acceleration values falling within certain named range bins. Next, the bin weighting procedure 322 is applied for calculating a mean and standard deviation 324 on a maneuver-by-maneuver basis that is used as a standard. The standards are stored in the database (block 326).

Referring still to FIG. 8, to calculate the maneuver scores, the bin data on each maneuver are collected (block 331), whereas the count in each bin is multiplied by the acceleration value of the midpoint of the bin range, and the resulting values for all bins are added together. The bin weighting procedure 332 is applied for each bin within a maneuver, whereas for each maneuver, the weighted mean and standard deviation of the acceleration sums for all vehicles in the fleet are calculated with the weights comprising the number of data points used to calculate the bin sum.

To calculate the score for each maneuver, for each vehicle for each maneuver, the bin sum is compared (block 334) to the weighted mean and standard deviation for the fleet that are previously calculated in block 326 and downloaded (arrow 327) from the database.

In one embodiment, the scoring process arbitrarily assumes that the fleet mean is a score of 100 and one standard deviation is a score of 10. The individual vehicle score is then calculated by comparing to the fleet statistics. For example, if the fleet mean is 0.20 and the standard deviation is 0.01, a vehicle with a measured acceleration of 0.22 would have a score of 120, and a measurement of 0.19 would be a score of 90. Other methods for generating the actual score may be envisioned, depending upon the desires of the end user and the statistical distribution of the individual vehicle bin sums within the fleet. For example, the mean score might be defined as zero and the variations from the mean might be positive or negative numbers.

The value in each bin is converted from a count to a weighted acceleration. Once the bins are weighted, the accelerations in all bins for that maneuver type are added together to determine a single average acceleration value for that maneuver type for that vehicle for that time period. The number of data points and the weighting are stored and carried along with the average, for analytical and historical documentations purposes.

The calculated scores for each maneuver are stored in the secure database (block 336) and are available to generate a safety report (block 338).

To calculate the composite score, a weighted average of the individual maneuver scores is taken (block 344), with the weights assigned based on the perceived importance of each maneuver in determining the composite (block 342). The composite scores are stored in the secured database (346) and also are available for the safety report (arrow 347).

In one embodiment, the DriveSafe data is stored in Trimble's Televisant database. The database is hosted in a secure data center for a high level of reliability and data access control. Each customer can see only their own vehicles' data, and access to the DriveSafe portion of the database is controlled on a user-by-user basis within the customer's staff.

The deployment of the DriveSafe system is a simple process. The hardware is installed in the vehicle, Trimble configures the hardware over the air, data are collected for at least two weeks, and the Web reports are run. The reports can be accessed either from a standalone Web site for DriveSafe-only customers, or as a Reporting menu option for Trimble's AutoStatus customers.

Lane Change Monitoring

Another factor which can be considered in evaluating a driver's performance is the speed, quantity, frequency, and aggressiveness of lane changes performed by the driver. For example, if a driver is performing a high quantity or frequency of lane changes, it may indicate that the driver is likely sacrificing safety in order to arrive at a destination sooner. Similarly, determining the radial acceleration experienced during a lane change gives an indication of the aggressiveness of the driver while changing lanes. Again, a driver who regularly performs aggressive lane changes is likely sacrificing safety in order to arrive at a destination sooner.

However, detecting actual lane changes presents a number of difficulties. For example, absent a camera or image recognition system, it cannot be determined with absolute certainty that a vehicle has actually crossed over the lines painted on a road. Furthermore, crossing a line does not inherently mean that the vehicle is changing lanes. For example, a vehicle leaving the highway is not "changing lanes." Therefore, for the purpose of the following discussion, the terms "lane change," and "changing lanes" are intended to mean that a vehicle moves from a first lane into a second lane which substantially parallels the first lane.

Another complication is the difficulty in detecting lane changes while the vehicle is going around a curve in the road. For example, the vehicle may simply be following the curve in one lane, be changing lanes while driving around the curve, or the curve itself may increase/decrease in radius depending upon the course of the road. Additionally, a vehicle may drift from the left side of a lane to the right side of a lane without actually changing lanes. Also, if a gradual lane change is performed it may be difficult to detect. Thus, overly gradual lane changes may not be captured by some types of equipment.

Driving in cities presents its own set of difficulties in detecting lane changes. For example, it is more often the case that roads in cities and built-up areas have move curves, slight bends, or "jogs" in the road than is the case on interstate highways. Thus, a vehicle may follow a more twisting path while never performing a lane change. This is especially true for streets/roads with lower speed limits (e.g., less than 35-40 mph).

Figure 9A:
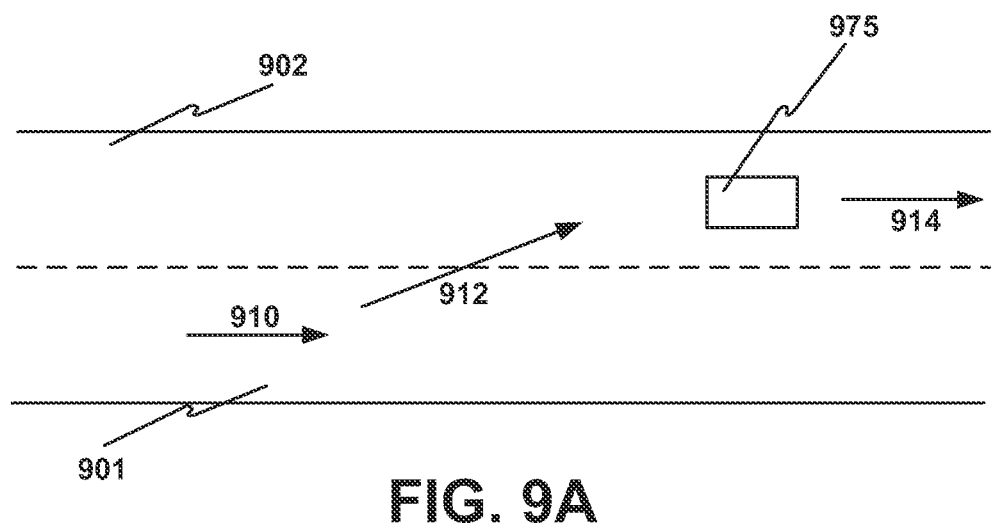
FIG. 9A shows an example roadway upon which a lane change is being performed.
Figure 9B:
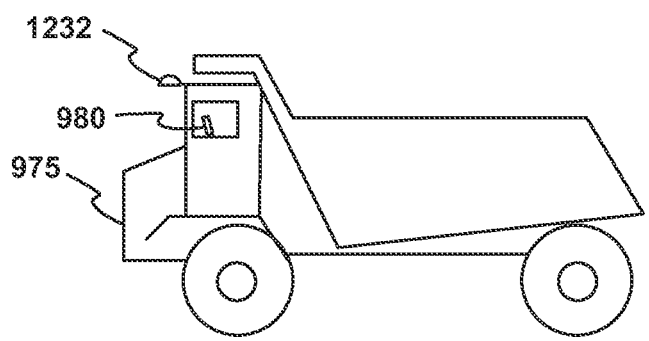
FIG. 9B shows an example vehicle implementing a road change detection system in accordance with at least one embodiment.
Figure 10:
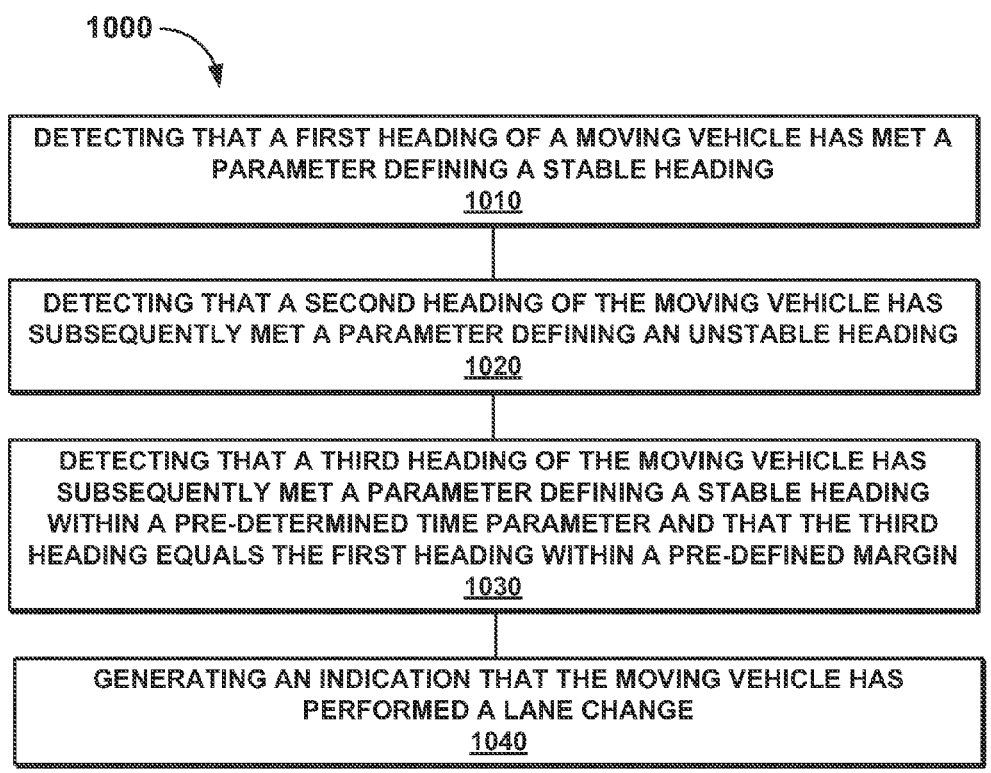
FIG. 10 is a flowchart of a method for detecting a lane change by a moving vehicle.

FIG. 10 is a flowchart of a method 1000 for detecting a lane change by a moving vehicle. In accordance with one or more embodiments, method 1000 can be implemented by a GNSS receiver (e.g., 1200 of FIG. 12), or by a lane change detection system (e.g., 980 of FIG. 9B). In operation 1010 of FIG. 10, a detection is made that a first heading of a moving vehicle has met a parameter defining a stable heading. Referring to FIG. 9A, as a vehicle travels down a highway, it follows a substantially stable heading such as represented by arrow 910. As will be described below, the determination of a stable heading such as shown by arrow 910 permits a range of deviation of the heading in one or more embodiments. This allows for the vehicle drifting in the traffic lane, or avoiding obstacles or debris in the road, without necessarily initiating a lane change. Furthermore, this facilitates differentiating between an actual lane change and some other action by the vehicle such as exiting the highway, or following a curve in the road.

In operation 1020 of FIG. 10, a detection is made that a second heading of the moving vehicle has subsequently met a parameter defining an unstable heading. As will be discussed in greater detail below, one indication that a vehicle is performing a lane change is the detection of a change in heading which exceeds a pre-defined parameter. This facilitates differentiating between a more gradual change in vehicle heading which may be caused by, for example, the vehicle drifting from side to side within a single traffic lane, or a curve in the road which the vehicle is following. Referring to FIG. 9A, an example unstable heading is shown by arrow 912 which occurs when the vehicle is moving from first lane 901 to second lane 902. While a vehicle (e.g., 975 of FIGS. 9A and 9B) is traveling in first lane 901 it substantially follows the heading indicated by arrow 910. As vehicle 975 makes a lane change into second lane 902, its heading changes or becomes "unstable". After it has completed the lane change into second lane 902, vehicle 975 will follow the heading indicated by arrow 914 which is substantially parallel to, or the same as, the heading indicated by arrow 910. The discussion of what is considered an "unstable heading" in accordance with various embodiments is further discussed below with reference to FIG. 11.

In operation 1030 of FIG. 10, a detection is made that a third heading of the moving vehicle has subsequently met a parameter defining a stable heading within a pre-determined time parameter and that the third heading equals the first heading within a pre-defined margin. In one or more embodiments, the stable third heading in which the vehicle is moving is within a pre-defined range descriptive of a previously detected stable heading (e.g., the first heading of operation 1010 of FIG. 10). In other words, the stable heading subsequently detected (e.g., heading 914 of FIG. 9A) is equal to, or within a pre-defined range of, a previously detected stable heading (e.g., heading 910 of FIG. 9A) which was previously detected. This facilitates differentiating between an actual lane change, in which the vehicle will return to a substantially parallel heading to that which it was traveling before initiating the lane change, and a turn or curve in the road in which the vehicle will subsequently be following a different heading than the previously detected stable heading. In accordance with one or more embodiments, when the lane change detection system detects that a vehicle is again moving in a stable direction which, it makes a determination that the vehicle has performed a lane change. In at least one embodiment, the detection that the vehicle is subsequently moving in a stable heading is subsequent to detecting that the vehicle has been moving in an unstable heading.

In operation 1040 of FIG. 10, an indication is generated that the moving vehicle has performed a lane change. In accordance with one or more embodiments, the lane change detection system generates an indication which can be stored locally, transmitted to a location apart from the lane change detection system, or used to generate a real-time notification.

Figure 11:
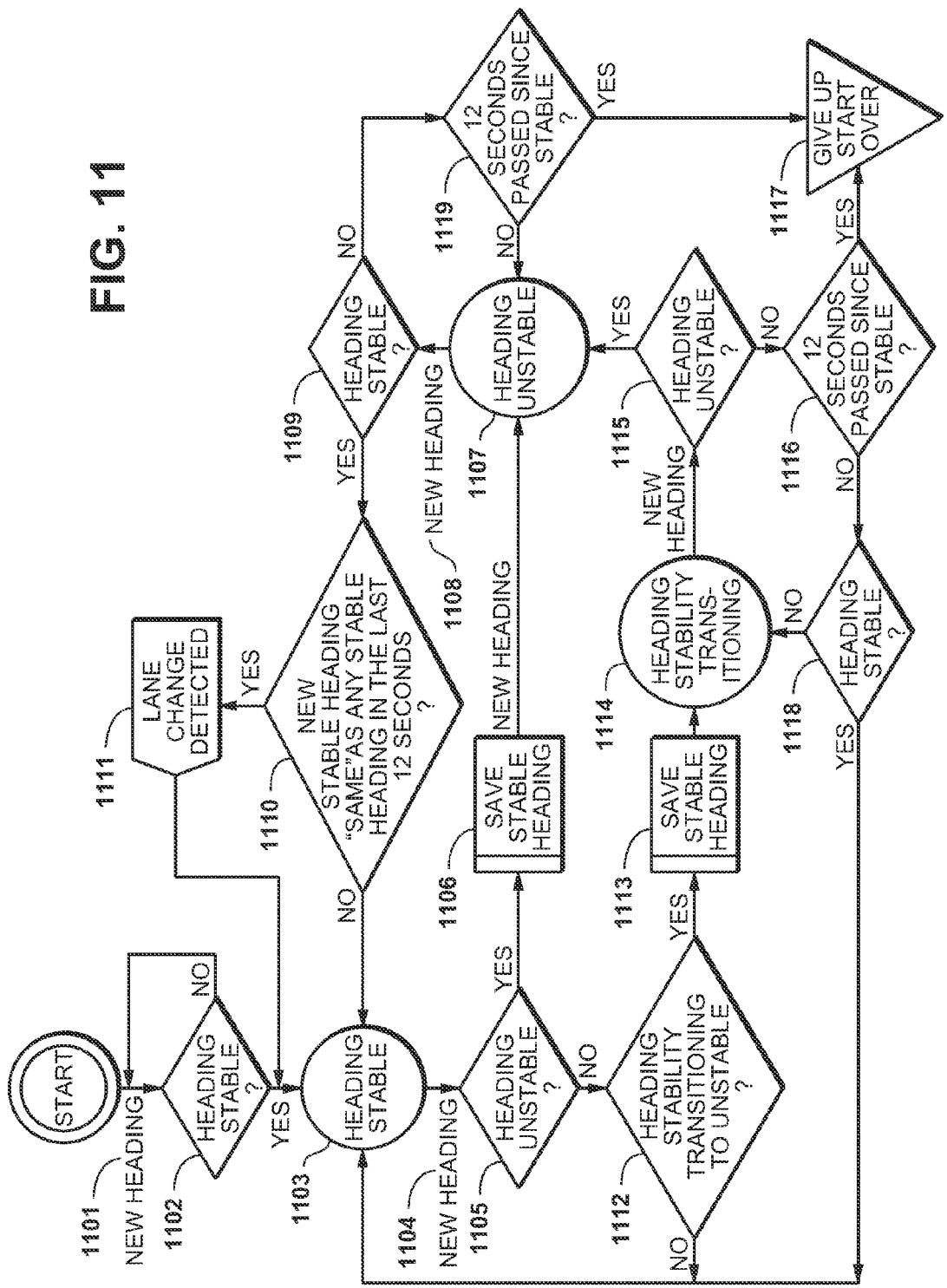
FIG. 11 is a diagram of operating states of a lane change detection system in accordance with one or more embodiments.

FIG. 11 is a diagram of operating states of a lane change detection system in accordance with one or more embodiments. In operation 1101, a determination is made as whether a vehicle is on a new heading. In one or more embodiments, lane change detection system 980 determines whether vehicle 975 is following a new heading on a periodic basis. For example, based upon heading information received from GNSS receiver 1200, lane change detection system 980 will assess whether vehicle 975 is following a new heading once every second. It is noted that operation of determining the heading followed by vehicle 975 can be performed more often, or less often, than once per second in various embodiments.

In one or more embodiments, lane change detection system 980 uses a measure of deviation to determine whether vehicle 975 is beginning to follow a new heading. Standard deviation is a widely used measurement of variability or diversity used in statistics and probability theory. It shows how much variation or "dispersion" there is from the average (mean, or expected value). A low standard deviation indicates that the data points tend to be very close to the mean. In the context of lane change detection system 980, a low deviation from a previously followed heading (e.g., 910 of FIG. 9A) indicates that vehicle 975 is substantially following the same heading. High standard deviation indicates that the data are spread out over a large range of values. In the context of lane change detection system 980, this indicates that the heading followed by vehicle 975 is beginning to deviate from the heading indicated by arrow 910 to a different heading such as that indicated by arrow 912. A greater deviation indicates that the heading followed by vehicle 975 is becoming increasingly divergent from its previously followed heading. Equation 1 below shows a formula for determining standard deviation.

$$\sigma = \sqrt{\frac{1}{N} \sum_{i=1}^{N} (x_i - \bar{x})^2} \quad \text{Equation 1}$$

In accordance with one or more embodiments, the determination of the heading of vehicle 975 is directed at performing comparisons of calculated stability with thresholds and is not directed at determining the actual value of the stability calculation (the actual value of standard deviation). Thus, in accordance with one or more embodiments, operations that are linearly correlated with the thresholds are removed, resulting in the selected algorithm for heading stability shown below in equation 2.

$$S_N = \sum_{i=1}^{N} (x_i - \bar{x})^2 \quad \text{Equation 2}$$

In at least one embodiment, lane change detection system 980 stores a plurality of previously determined headings followed by vehicle 975. For example, in one embodiment, lane change detection system 980 stores three previously determined headings for vehicle 975. As each new heading for vehicle 975 is determined, it is stored (e.g., in volatile memory 1308 of FIG. 13) and the oldest determined heading for vehicle 975 is written over or deleted. Thus, referring to equation 2 above, in one embodiment, N=3.

Returning to FIG. 11, if it is determined that vehicle 975 is following a stable heading, lane change detection system 980 enters a heading stable state (e.g., 1103 of FIG. 11). While in this state, lane change detection system 980 will continue to monitor whether vehicle 975 is following the same heading, or beginning to follow a new heading.

If lane change detection system 980 determines that vehicle 975 is following a new heading (e.g., 1104 of FIG. 11), it will make a determination of whether the heading followed by vehicle 975 is an unstable heading, or is transitioning to an unstable heading (e.g., 1105 of FIG. 11). In accordance with one or more embodiments, lane change detection system 980 is configured to differentiate between a heading stability transitioning condition and a heading unstable condition based upon the magnitude of deviation of the heading of vehicle 975. In accordance with one or more embodiments, the threshold for determining whether vehicle 975 is in a heading stability transitioning condition and a heading unstable condition can be set by a user, or be a pre-set default value of the deviation, as determined using equation 2 above.

Figure 14:
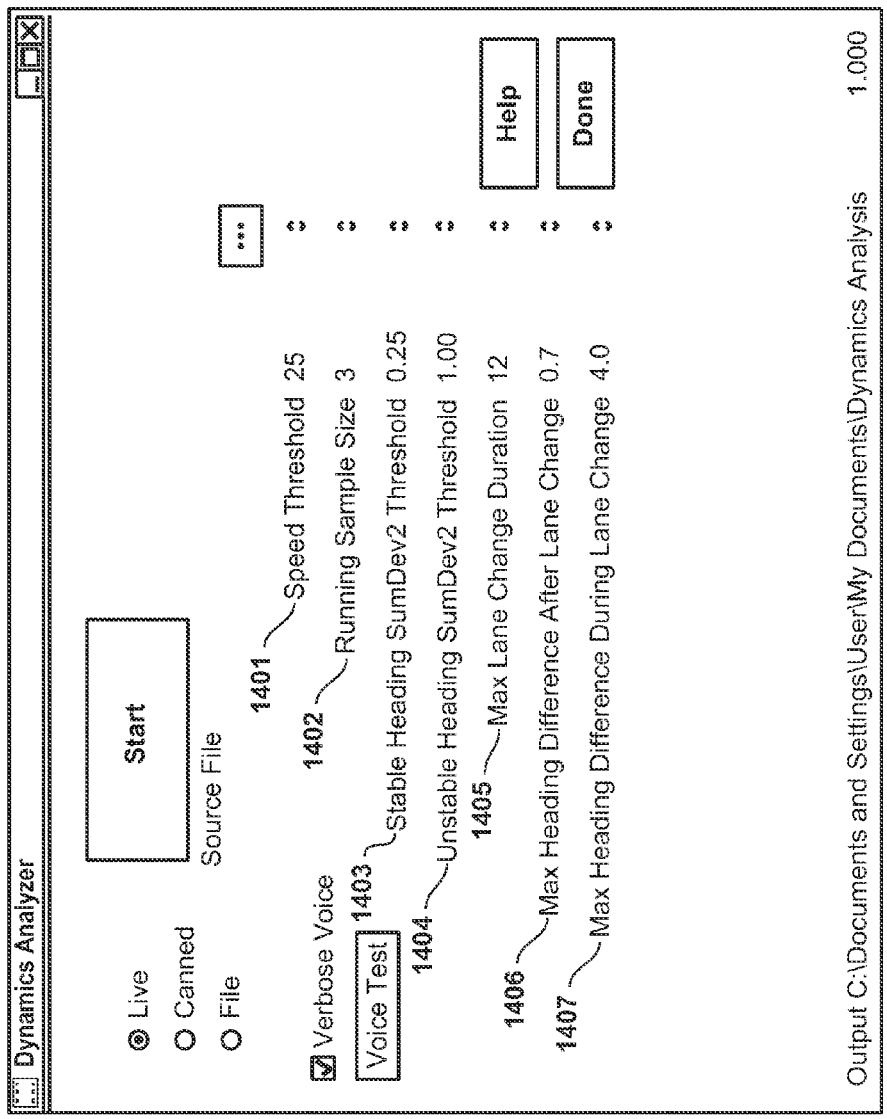
FIG. 14 shows an example set-up interface for a lane change detection system in accordance with one or more embodiments.

FIG. 14 shows an example set-up interface 1400 for a lane change detection system in accordance with one or more embodiments. In FIG. 14, a plurality of drop-down boxes are displayed which permit a user to configure lane change detection system 980. For example, drop-down box 1401 permits a user to set a minimum speed for vehicle 975. In accordance with at least one embodiment, if vehicle 975 is traveling below the speed set in drop-down box 1401, lane change detection system 980 will not perform operations to determine whether a lane change has occurred. This prevents lane change detection system 980 from operating when vehicle 975 is likely within an urban area characterized by lower speed limits, and more turns/twists in the road, than an interstate highway. Drop-down box 1402 permits a user to set the sample size used in equation 2 above to determine the deviation in heading of vehicle 975.

Drop-down box 1403 allows a user to set the maximum threshold value defining a stable heading of vehicle 975. Similarly, drop-down box 1404 allows a user to set the minimum threshold value defining an unstable heading of vehicle 975. In accordance with at least one embodiment, after determining that the deviation of vehicle 975 exceeds the value set in drop-down box 1403, lane change detection system 980 determines that vehicle 975 is following a new heading (e.g., 1104 of FIG. 11). If the deviation in the heading followed by vehicle 975 is higher than the value set in drop-down box 1403, but less than the value set in drop-down box 1404, lane change detection system 980 determines that the heading followed by vehicle 975 is transitioning to unstable (e.g., 1112 of FIG. 11). If the deviation in the heading followed by vehicle 975 is higher than the value set in drop-down box 1404, lane change detection system 980 determines that the heading followed by vehicle 975 is an unstable heading (e.g., 1105 of FIG. 11). This permits differentiating between what is considered an intentional lane change and some lesser maneuvering of vehicle 975 such as drifting from one side of first lane 901 to the other side.

Drop-down box 1405 allows a user to set the maximum duration of a lane change. For example, if vehicle 975 is following a curve in the road, its heading will likely exceed the value set in drop-down box 1403 for a longer period than if vehicle 975 is simply changing lanes. Drop-down box 1405 allows a user to determine the period time in which a lane change must occur in order to be considered a valid lane change. Drop-down box 1406 allows a user to set the maximum heading difference (e.g., in degrees) for vehicle 975 after a lane change has occurred. As discussed above, in a typical lane change, the heading followed by vehicle after the lane change (e.g., 914 of FIG. 9A) is substantially parallel with to the heading followed by vehicle 975 before the lane change was initiated (e.g., 910 of FIG. 9A). Using the value set in drop-down box 1406, a user can differentiate, for example, between a lane change and a curve in the road followed by vehicle 975. Drop-down box 1407 allows a user to set a maximum change in heading (e.g., in degrees) during a lane change. For example, most lane changes involve a change in heading of between one and two and one half (1-2½) degrees. Thus, a change in heading which exceeds the value set in drop-down box 1407 is more likely a turn by vehicle 975. Thus, in one or more embodiments, lane change detection system will not perform operations to determine whether a lane change has occurred if the heading deviation exceeds the value set in drop-down box 1407.

Returning now to FIG. 11, if lane change detection system 980 determines that the new heading of vehicle 975 comprises an unstable heading (e.g., exceeds the value set in drop-down box 1404 of FIG. 14), the value of the previously determined stable heading of vehicle 975 is saved (e.g., 1106 of FIG. 11). As an example, if it is determined that the heading represented by arrow 912 of FIG. 9A comprises an unstable heading, the value of the previously determined stable heading (e.g., 910 of FIG. 9A) is saved. Lane change detection system 980 then enters a heading unstable operating state (e.g., 1107 of FIG. 11). In operation 1109, lane change detection system 980 will determine whether vehicle 975 is following a stable heading. If it is determined that vehicle 975 is not following a stable heading, and if the maximum duration for a lane change as set in drop-down box 1405, is exceeded, lane change detection system 980 will cease classifying the current travel of vehicle 975 as a lane change and start over (e.g., 1117 of FIG. 11). If lane change detection system 980 subsequently determines (e.g., operation 1108) that vehicle 975 if following a new heading rather than the unstable heading detected at operation 1104 (e.g., following the heading indicated by arrow 914 of FIG. 9A rather than the heading indicated by arrow 912), it will determine whether vehicle 975 is again following a stable heading. In other words, as the driver of vehicle 975 finishes the lane change, the driver will again steer vehicle 975 onto a heading (e.g., 914 of FIG. 9A) which is substantially parallel with the heading followed before the lane change was initiated (e.g., 910 of FIG. 9A). The transition from the heading 912 to heading 914 is captured in operation 1108 of FIG. 11 and the return to heading 914 is captured in operation 1109 of FIG. 11.

In operation 1110, it is determined whether the new stable heading (e.g., 914 of FIG. 9A) is the "same" as any stable heading in the last 12 seconds. In other words, is the new stable heading less than or equal to the maximum heading difference set in drop-down box 1406 of FIG. 14. Furthermore, has the new stable heading been achieved within the maximum lane change duration parameter set in drop-down box 1405 of FIG. 14. In at least one embodiment, if these conditions are met, lane change detection system 980 determines that vehicle 975 has performed a lane change and will generate an indication of this lane change. In at least one embodiment, the indication of the lane change is stored by lane change detection system 980 itself (e.g., in volatile memory 1308 or data storage unit 1312 for example). In another embodiment, the indication of the lane change can be transmitted in real-time to a location apart from lane change detection system 980. Alternatively, lane change detection system 980 can store this information and transmit it to another node when communications with the other node are detected. In at least one embodiment, if the conditions stated in operation 1110 are not met, lane change detection system 980 will return to the heading stable operating state.

In one or more embodiments, if at operation 1105 it is determined that the deviation of the heading of vehicle 975 exceeds the value set in drop-down box 1403 of FIG. 14, but is less than the value set in drop-down box 1404, lane change detection system 980 will determine that vehicle 975 is transitioning to an unstable heading (e.g., operation 1112). In other words, the change in heading is enough to no longer be considered stable, but is not of sufficient magnitude to be considered an unstable heading yet. If it is determined that vehicle 975 is transitioning to an unstable heading, the value of the previously determined stable heading of vehicle 975 is saved in operation 1113. Lane change detection system 980 then enters the heading stability transitioning operating state (e.g., 1114).

In operation 1115, it is determined whether the heading of vehicle 975 is unstable (e.g., exceeding the value set in drop-down box 1404 of FIG. 14). If the heading of vehicle 975 now exceeds the value set in drop-down box 1404, lane change detection system 980 enters the heading unstable operating state described above. If the heading of vehicle 975 does not exceed the value set in drop-down box 1404, it will be determined whether the maximum lane change duration parameter has been exceeded (e.g., the value set in drop-down box 1405 has been exceeded) in operation 1116. If the value set in drop-down box 1405 has been exceeded, lane change detection system 980 will cease classifying the current travel of vehicle 975 as a lane change and start over (e.g., 1117 of FIG. 11). If the value set in drop-down box 1405 has not yet been exceeded, lane change detection system 980 will again determine (e.g., operation 1118) whether vehicle 975 is following a stable heading. If it is determined that vehicle 975 is now following a stable heading (e.g., the deviation of the heading of vehicle 975 is now less that the value set in drop-down 1403), lane change detection system 980 returns to the heading stable operating state (e.g. 1103). If it is determined that the deviation in the heading followed by vehicle 975 is still between the values set in drop-down boxes 1403 and 1404, lane change detection system 980 returns to the heading stability transitioning operating state (e.g., 1114).

In one or more embodiments, lane change detection system 980 is configured to record whether vehicle 975 is weaving in traffic. For example, if a given number of lane changes are performed within a pre-determined time period (e.g., 3 or more lane changes per minute), or if a given number of lane changes are performed within a pre-determined distance (e.g., 3 or more lane changes per mile), lane change detection system 980 is configured to determine that vehicle 975 is weaving in traffic and can generate an indication of this (e.g., stored in volatile memory 1308, data storage unit 1312, or transmitted to a location apart from lane change detection system 980). In another embodiment, if lane change detection system 980 detects successive lane changes in the same direction (e.g., 2 or more lane changes to the right within 15 seconds), it may determine that the driver of vehicle 975 is making a panic exit. Again, lane change detection system 980 can generate an indication of this (e.g., stored in volatile memory 1308, data storage unit 1312, or transmitted to a location apart from lane change detection system 980). Additionally, in one or more embodiments, lane change detection system 980 can implement an algorithm which derives the radial acceleration of vehicle 975 based upon successive GNSS velocities.

Example GNSS Receiver

Figure 12:
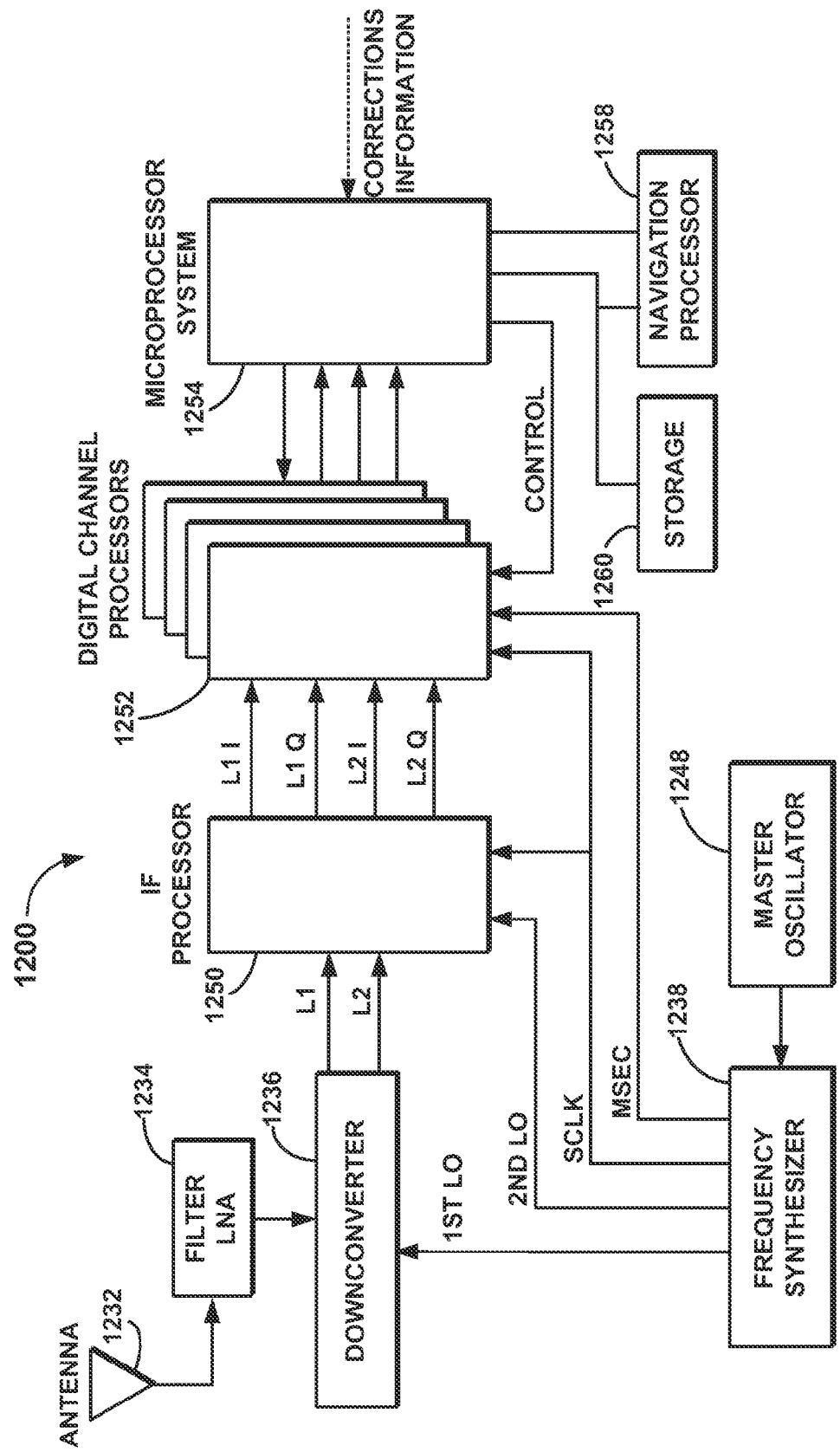
FIG. 12 shows an example GNSS receiver in accordance with one or more embodiments.

FIG. 12, shows an example GNSS receiver 1200, according to one embodiment which may be incorporated entirely, or in part, within a lane change detection system (e.g., 980 of FIG. 9B). It is appreciated that different types or variations of GNSS receivers may also be suitable for use in the embodiments described herein. In FIG. 12, received L1 and L2 signals are generated by at least one GPS satellite. Each GPS satellite generates different signal L1 and L2 signals and they are processed by different digital channel processors 952 which operate in the same way as one another. FIG. 12 shows GPS signals (L1=1575.42 MHz, L2=1227.60 MHz) entering GPS receiver 1200 through a dual frequency antenna 1232. Antenna 1232 may be a magnetically mountable model commercially available from Trimble Navigation of Sunnyvale, Calif. Master oscillator 1248 provides the reference oscillator which drives all other clocks in the system. Frequency synthesizer 1238 takes the output of master oscillator 1248 and generates important clock and local oscillator frequencies used throughout the system. For example, in one embodiment frequency synthesizer 1238 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 1234 performs filtering and low noise amplification of both L1 and L2 signals. The noise figure of GPS receiver 1200 is dictated by the performance of the filter/LNA combination. The downconvertor 1236 mixes both L1 and L2 signals in frequency down to approximately 175 MHz and outputs the analogue L1 and L2 signals into an IF (intermediate frequency) processor 1250. IF processor 1250 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 1252 inputs the digitally sampled L1 and L2 inphase and quadrature signals. All digital channel processors 1252 are typically are identical by design and typically operate on identical input samples. Each digital channel processor 1252 is designed to digitally track the L1 and L2 signals produced by one satellite by tracking code and carrier signals and to from code and carrier phase measurements in conjunction with the microprocessor system 1254. One digital channel processor 1252 is capable of tracking one satellite in both L1 and L2 channels. Microprocessor system 1254 is a general purpose computing device (such as computer system 1000 of FIG. 10) which facilitates tracking and measurements processes, providing pseudorange and carrier phase measurements for a navigation processor 1258. In one embodiment, microprocessor system 1254 provides signals to control the operation of one or more digital channel processors 1252. Navigation processor 1258 performs the higher level function of combining measurements in such a way as to produce position, velocity and time information for the differential and surveying functions. Storage 1260 is coupled with navigation processor 1258 and microprocessor system 1254. It is appreciated that storage 1260 may comprise a volatile or non-volatile storage such as a RAM or ROM, or some other computer readable memory device or media. In one rover receiver embodiment, navigation processor 1258 performs one or more of the methods of position correction.

In some embodiments, microprocessor 1254 and/or navigation processor 1258 receive additional inputs for use in refining position information determined by GPS receiver 1200. In some embodiments, for example, corrections information is received and utilized. Such corrections information can include differential GPS corrections, RTK corrections, and wide area augmentation system (WAAS) corrections.

Example Computer System Environment

Figure 13:
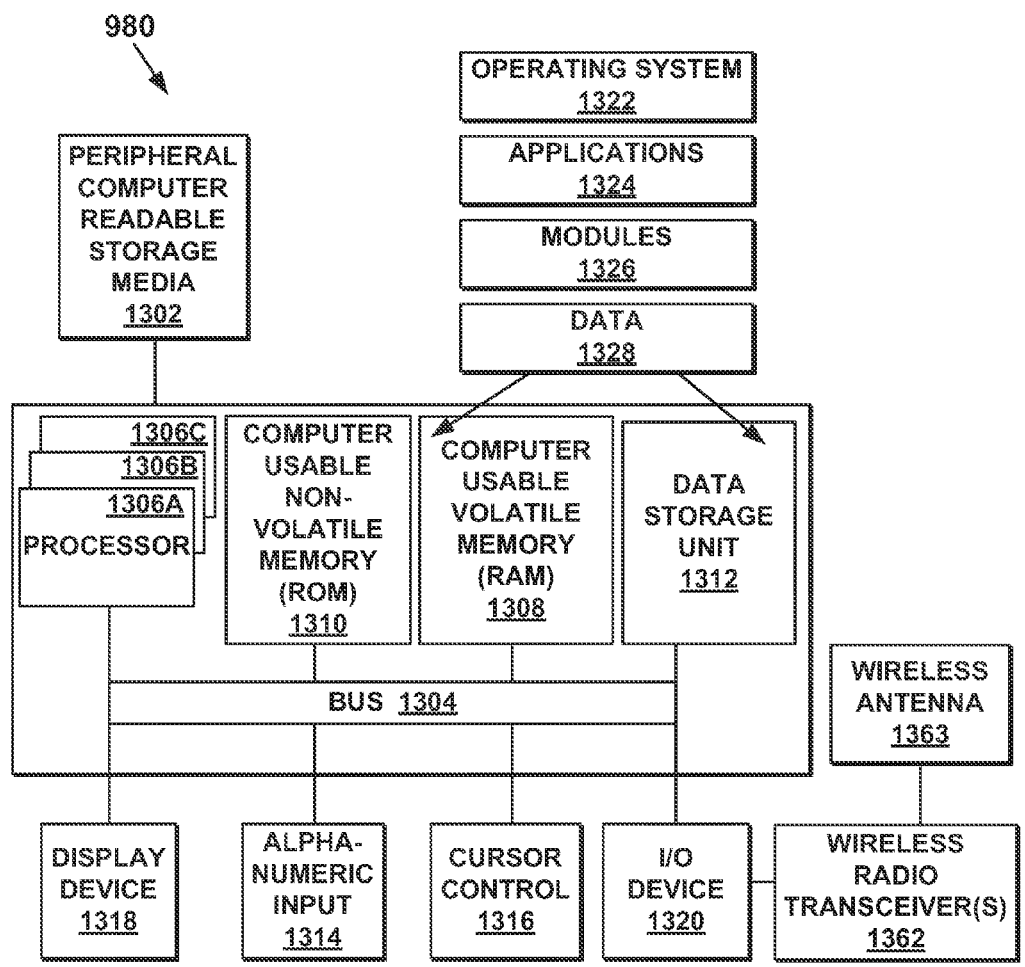
FIG. 13 illustrates one example computer system that can be used in accordance with or to implement various embodiments which are discussed herein.

With reference now to FIG. 13, all or portions of some embodiments described herein are composed of computer-readable and computer-executable instructions that reside, for example, in computer-usable/computer-readable storage media of a computer system. That is, FIG. 13 illustrates one example of a type of computer system (e.g., lane change detection system 980 of FIG. 9B) that can be used in accordance with or to implement various embodiments which are discussed herein. It is appreciated that lane change detection system 980 of FIG. 13 is only an example and that embodiments as described herein can operate on or within a number of different computer systems including, but not limited to, general purpose networked computer systems, embedded computer systems, server devices, various intermediate devices/nodes, stand alone computer systems, handheld computer systems, multi-media devices, and the like.

Lane change detection system 980 of FIG. 13 is well adapted to having peripheral computer-readable storage media 1302 such as, for example, a floppy disk, a compact disc, digital versatile disc, universal serial bus "thumb" drive, removable memory card, and the like coupled thereto.

Lane change detection system 980 of FIG. 13 includes an address/data bus 1304 for communicating information, and a processor 1306A coupled to bus 1304 for processing information and instructions. As depicted in FIG. 13, lane change detection system 980 is also well suited to a multi-processor environment in which a plurality of processors 1306A, 1306B, and 1306C are present. Conversely, lane change detection system 980 is also well suited to having a single processor such as, for example, processor 1306A. Processors 1306A, 1306B, and 1306C may be any of various types of microprocessors. Lane change detection system 980 also includes data storage features such as a computer usable volatile memory 1308, e.g., random access memory (RAM), coupled to bus 1304 for storing information and instructions for processors 1306A, 1306B, and 1306C. System 1300 also includes computer usable non-volatile memory 1310, e.g., read only memory (ROM), coupled to bus 1304 for storing static information and instructions for processors 1306A, 1306B, and 1306C. Also present in lane change detection system 980 is a data storage unit 1312 (e.g., a magnetic or optical disk and disk drive) coupled to bus 1304 for storing information and instructions. Lane change detection system 980 also includes an optional alphanumeric input device 1314 including alphanumeric and function keys coupled to bus 1304 for communicating information and command selections to processor 1306A or processors 1306A, 1306B, and 1306C. Lane change detection system 980 also includes an optional cursor control device 1316 coupled to bus 1304 for communicating user input information and command selections to processor 1306A or processors 1306A, 1306B, and 1306C. In one embodiment, lane change detection system 980 also includes an optional display device 1318 coupled to bus 1304 for displaying information.

Referring still to FIG. 13, optional display device 1318 of FIG. 13 may be a liquid crystal device, cathode ray tube, plasma display device or other display device suitable for creating graphic images and alphanumeric characters recognizable to a user. Optional cursor control device 1316 allows the computer user to dynamically signal the movement of a visible symbol (cursor) on a display screen of display device 1318 and indicate user selections of selectable items displayed on display device 1318. Many implementations of cursor control device 1316 are known in the art including a trackball, mouse, touch pad, joystick or special keys on alphanumeric input device 1314 capable of signaling movement of a given direction or manner of displacement. Alternatively, it will be appreciated that a cursor can be directed and/or activated via input from alphanumeric input device 1314 using special keys and key sequence commands. Lane change detection system 980 is also well suited to having a cursor directed by other means such as, for example, voice commands. Lane change detection system 980 also includes an I/O device 1320 for coupling system 1300 with external entities such as, for example, GNSS receiver 1200 of FIG. 12. For example, in one embodiment, I/O device 1320 is a modem for enabling wired or wireless communications between system 1300 and an external network such as, but not limited to, the Internet. In the example of FIG. 13, I/O device 1320 is communicatively coupled with one or more wireless radio transceivers 1362 which are coupled with a wireless antenna 1363. In accordance with various embodiments, one or more of wireless radio transceivers 1362 may operate on any suitable wireless communication protocol including, but not limited to: WiFi, WiMAX, WWAN, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard). Personal area networks refer to short-range, and often low-data-rate, wireless communications networks. In accordance with embodiments of the present technology, components of an ad-hoc wireless personal area network used by lane change detection system 980 are configured for automatic detection of other components and for automatically establishing wireless communications. In one embodiment, lane change detection system 980 a first wireless radio transceiver 1362 for communicating with other components of an ad-hoc wireless personal area network and one or more wireless radio transceivers 1362 for wirelessly communicating outside of the ad-hoc wireless personal area network.

Referring still to FIG. 13, various other components are depicted for lane change detection system 980. Specifically, when present, an operating system 1322, applications 1324, modules 1326, and data 1328 are shown as typically residing in one or some combination of computer usable volatile memory 1308 (e.g., RAM), computer usable non-volatile memory 1310 (e.g., ROM), and data storage unit 1312. In some embodiments, all or portions of various embodiments described herein are stored, for example, as an application 1324 and/or module 1326 in memory locations within RAM 1308, computer-readable storage media within data storage unit 1312, peripheral computer-readable storage media 1302, and/or other tangible computer readable storage media.

What is claimed is:

1. A method, performed by a computer processor, for detecting a lane change by a moving vehicle, said method comprising:
   detecting in real time, using said computer processor and a Global Navigation Satellite System (GNSS) receiver coupled to the moving vehicle, that a first heading of the moving vehicle has met a parameter defining a first stable heading;
   detecting in real time, using the GNSS receiver and said computer processor, that a second heading of said moving vehicle has subsequently met a parameter defining an unstable heading;
   detecting in real time, using the GNSS receiver and said computer processor, that a third heading of said moving vehicle has subsequently met a parameter defining a second stable heading within a pre-determined time parameter and that said second stable heading equals said first stable heading within a pre-defined margin; and
   generating, by said computer processor, an indication that said moving vehicle has performed the lane change.

2. The method of claim 1 further comprising:
   determining, using said computer processor and said GNSS receiver, a radial acceleration of said moving vehicle during said lane change.

3. The method of claim 1 further comprising:
   storing, by said computer processor, a plurality of previously determined headings of said moving vehicle;

determining, by said computer processor, a deviation in a heading of said moving vehicle based upon an analysis of said plurality of previously determined headings of said moving vehicle; and determining, by said computer processor, that said deviation exceeds said parameter defining said first stable heading.

4. The method of claim 3 further comprising:

storing, by said computer processor, said heading in response to said determining that said deviation exceeds said parameter defining said first stable heading.

5. The method of claim 4 wherein said detecting that said second stable heading equals said first stable heading within the pre-defined margin comprises:

comparing, by said computer processor, said second stable heading of said moving vehicle with said first stable heading; and determining, by said computer processor, that said second stable heading is within a pre-defined margin descriptive of said first stable heading.

6. The method of claim 1 further comprising:

detecting, by said computer processor, that said moving vehicle has performed a plurality of said lane changes;

determining, by said computer processor, that said plurality of said lane changes exceeds a pre-defined parameter based upon the time elapsed to perform said plurality of said lane changes; and generating, by said computer processor, an indication that said moving vehicle is weaving in traffic based upon said determining.

7. The method of claim 1 further comprising:

detecting, by said computer processor, that said moving vehicle has performed a plurality of said lane changes;

determining, by said computer processor, that said plurality of said lane changes exceeds a pre-defined parameter based upon the distance travelled by said moving vehicle while performing said plurality of said lane changes; and generating, by said computer processor, an indication that said moving vehicle is weaving in traffic based upon said determining.

8. A non-transitory computer-readable storage medium comprising computer executable code for directing a processor to execute a method for detecting a lane change by a moving vehicle, said method comprising:

detecting in real time, using the processor and a Global Navigation Satellite System (GNSS) receiver coupled to the moving vehicle, that a first heading of the moving vehicle has met a parameter defining a first stable heading;

detecting in real time, using the GNSS receiver, that a second heading of said moving vehicle has subsequently met a parameter defining an unstable heading;

detecting in real time, using the GNSS receiver, that a third heading of said moving vehicle has subsequently met a parameter defining a second stable heading within a pre-determined time parameter and that said second stable heading equals said first stable heading within a pre-defined margin; and generating an indication that said moving vehicle has performed the lane change.

9. The non-transitory computer-readable storage medium of claim 8 wherein said method further comprises:

determining, using said GNSS receiver, a radial acceleration of said moving vehicle during said lane change.

10. The non-transitory computer-readable storage medium of claim 8 wherein said method further comprises:

storing a plurality of previously determined headings of said moving vehicle;

determining a deviation in a heading of said moving vehicle based upon an analysis of said plurality of previously determined headings of said moving vehicle; and determining that said deviation exceeds said parameter defining said first stable heading.

11. The non-transitory computer-readable storage medium of claim 10 wherein said method further comprises:

storing said heading in response to said determining that said deviation exceeds said parameter defining said first stable heading.

12. The non-transitory computer-readable storage medium of claim 11 wherein said detecting that said second stable heading equals said first stable heading within the pre-defined margin comprises:

comparing said second stable heading of said moving vehicle with said first stable heading; and determining that said second stable heading is within a pre-defined margin descriptive of said first stable heading.

13. The non-transitory computer-readable storage medium of claim 8 wherein said method further comprises:

detecting that said moving vehicle has performed a plurality of said lane changes;

determining that said plurality of said lane changes exceeds a pre-defined parameter based upon the time elapsed to perform said plurality of said lane changes; and generating an indication that said moving vehicle is weaving in traffic based upon said determining.

14. The non-transitory computer-readable storage medium of claim 8 wherein said method further comprises:

detecting that said moving vehicle has performed a plurality of said lane changes;

determining that said plurality of said lane changes exceeds a pre-defined parameter based upon the distance travelled by said moving vehicle while performing said plurality of said lane changes; and generating an indication that said moving vehicle is weaving in traffic based upon said determining.

15. A system for detecting lane changes by a moving vehicle, said system comprising:

a bus;

a memory coupled with said bus;

a Global Navigation Satellite System (GNSS) receiver coupled to the moving vehicle and configured to detect in real time a first heading, a second heading, and a third heading of the moving vehicle; and a processor coupled with said bus and the GNSS receiver, said processor configured to determine that the first heading of the moving vehicle has met a parameter defining a first stable heading, to determine that the second heading of said moving vehicle has subsequently met a parameter defining an unstable heading, to determine that the third heading of said moving vehicle has subsequently met a parameter defining a second stable heading within a pre-determined time parameter and that said second stable heading equals said first stable heading within a pre-defined margin, and to generate an indication that said moving vehicle has performed the lane change.

16. The system of claim 15 wherein said processor is configured to determine a radial acceleration of said moving vehicle during said lane change based upon data from said GNSS receiver.

17. The system of claim 15 wherein said processor is further configured to store a plurality of previously determined headings of said moving vehicle, determine a deviation in said second heading of said moving vehicle based upon an analysis of said plurality of previously determined headings of said moving vehicle, and determine that said deviation exceeds said parameter defining said previously detected first stable heading of said first heading.

18. The system of claim 17 wherein said processor is configured to store said first heading in response to said determining that said deviation exceeds said parameter defining said first stable heading.

19. The system of claim 18 wherein processor is further configured to compare said second stable heading of said moving vehicle with said first stable heading and to determine that said second stable heading is within the pre-defined range descriptive of said first stable heading.

20. The system of claim 15 wherein said processor is further configured to determine said moving vehicle has performed a plurality of said lane changes which exceeds a pre-defined parameter based upon the time elapsed to perform said plurality of said lane changes, and to generate an indication that said moving vehicle is weaving in traffic based upon said determining.

21. The system of claim 15 wherein said processor is further configured to determine that said moving vehicle has performed a plurality of said lane changes which exceeds a pre-defined parameter based upon the distance travelled by said moving vehicle while performing said plurality of said lane changes, and to generate an indication that said moving vehicle is weaving in traffic based upon said determining.

* * * * *